(12) United States Patent
Chemo et al.

(10) Patent No.: US 6,644,341 B1
(45) Date of Patent: Nov. 11, 2003

(54) MULTI-BARREL PLANT INOCULATION GUN

(75) Inventors: Ronen Chemo, Hanegev (IL); Itai Maoz, Hanegev (IL); Gal Yarden, Hanegev (IL)

(73) Assignee: Bio-Oz Advanced Biotechnological Agriculture Ltd., Yad Mordechay (IL)

( * ) Notice: Subject to any disclaimer, the term of this patent is extended or adjusted under 35 U.S.C. 154(b) by 0 days.

(21) Appl. No.: 09/889,853

(22) PCT Filed: Jan. 20, 2000

(86) PCT No.: PCT/IL00/00039

§ 371 (c)(1),
(2), (4) Date: Oct. 29, 2001

(87) PCT Pub. No.: WO00/42835

PCT Pub. Date: Jul. 27, 2000

(30) Foreign Application Priority Data

Jan. 24, 1999 (IL) .................................................. 128207

(51) Int. Cl.[7] .............................. F16L 3/00; A01G 31/02
(52) U.S. Cl. .............................. 137/343; 47/65; 47/901; 198/810.03; 239/282; 239/556; 239/750
(58) Field of Search ................................. 137/343, 899; 47/901, 65; 239/282, 548, 556, 750; 198/810.03

(56) References Cited

U.S. PATENT DOCUMENTS 3,337,968 A * 8/1967 Boucher .......................... 47/1
4,813,604 A * 3/1989 Curran, Jr. .................. 239/163
5,134,961 A * 8/1992 Giles et al. .................. 118/684
5,971,294 A * 10/1999 Thompson et al. ........... 239/76
6,055,771 A * 5/2000 Warnacut ..................... 47/58.1
6,375,089 B1 * 4/2002 Taylor et al. ................ 239/164

FOREIGN PATENT DOCUMENTS

WO       WO 96 05721       2/1996

* cited by examiner

Primary Examiner—A. Michael Chambers
(74) Attorney, Agent, or Firm—G.E. Ehrlich (1995) Ltd.

(57) ABSTRACT

The present invention relates to multi-barrel plant inoculation gun for a rapid large-scale plant and virus inoculation comprising (a) liquid container for inoculum solution (27); (b) compressed-gas source; (c) at least one compressed gas fast-discharge-container (28) having a gas inlet (34) connected to the compressed-gas source, and a gas outlet connected to a gas fast-discharge-valve; (29) (d) plurality of jet-injection units (35) each comprised of a body (20) having a liquid inlet (24) connected to the liquid container (27), gas inlet (23) connected to the gas fast-discharge (29) and a jet-outlet (21) internally connected to the liquid and gas inlets, (e) control unit for triggering-on the fast-discharge-valve; (f) chassis for positioning and supporting said elements.

12 Claims, 3 Drawing Sheets

MULTI-BARREL PLANT INOCULATION GUN

FIELD OF THE INVENTION

Figure 1:
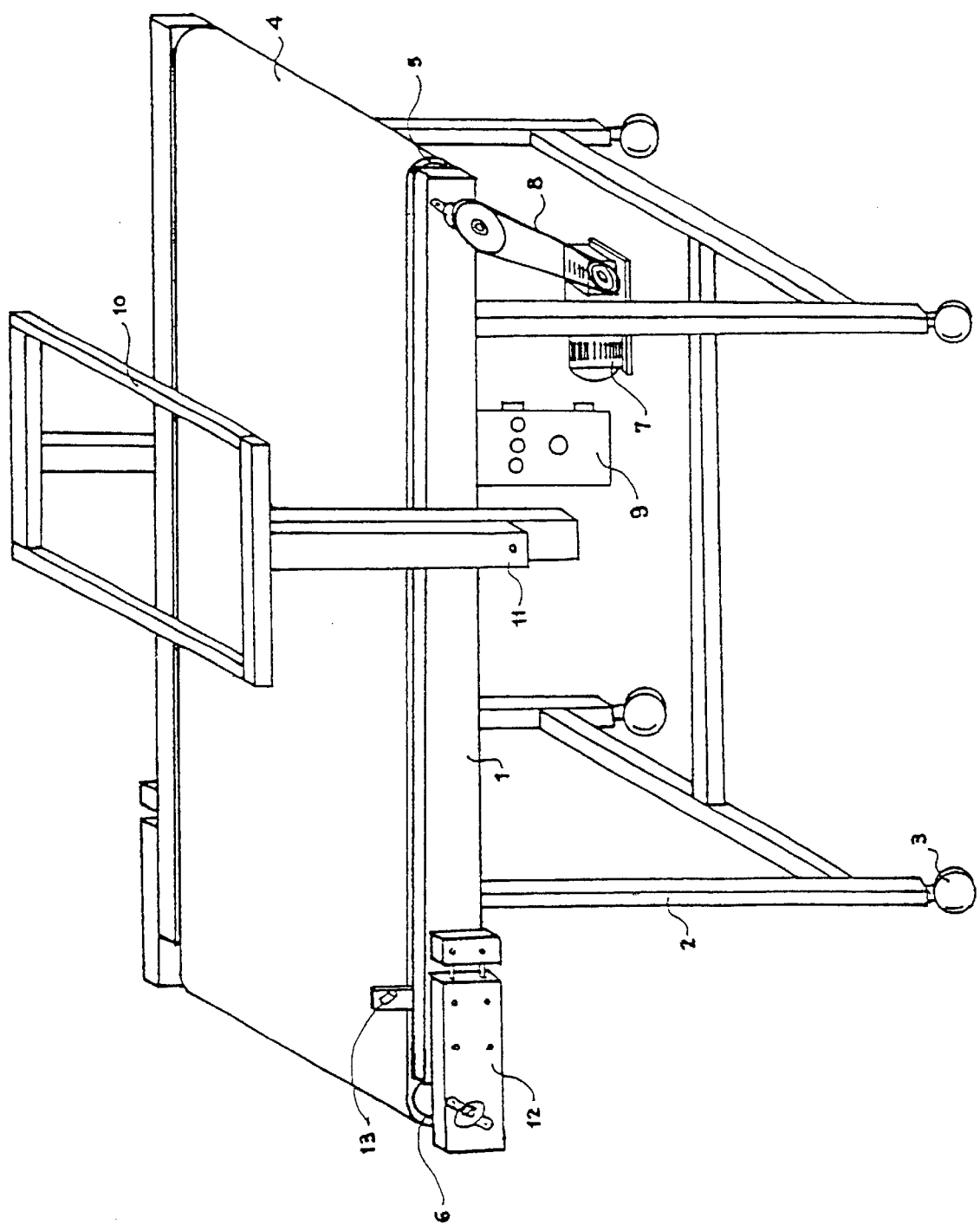
Figure 2:
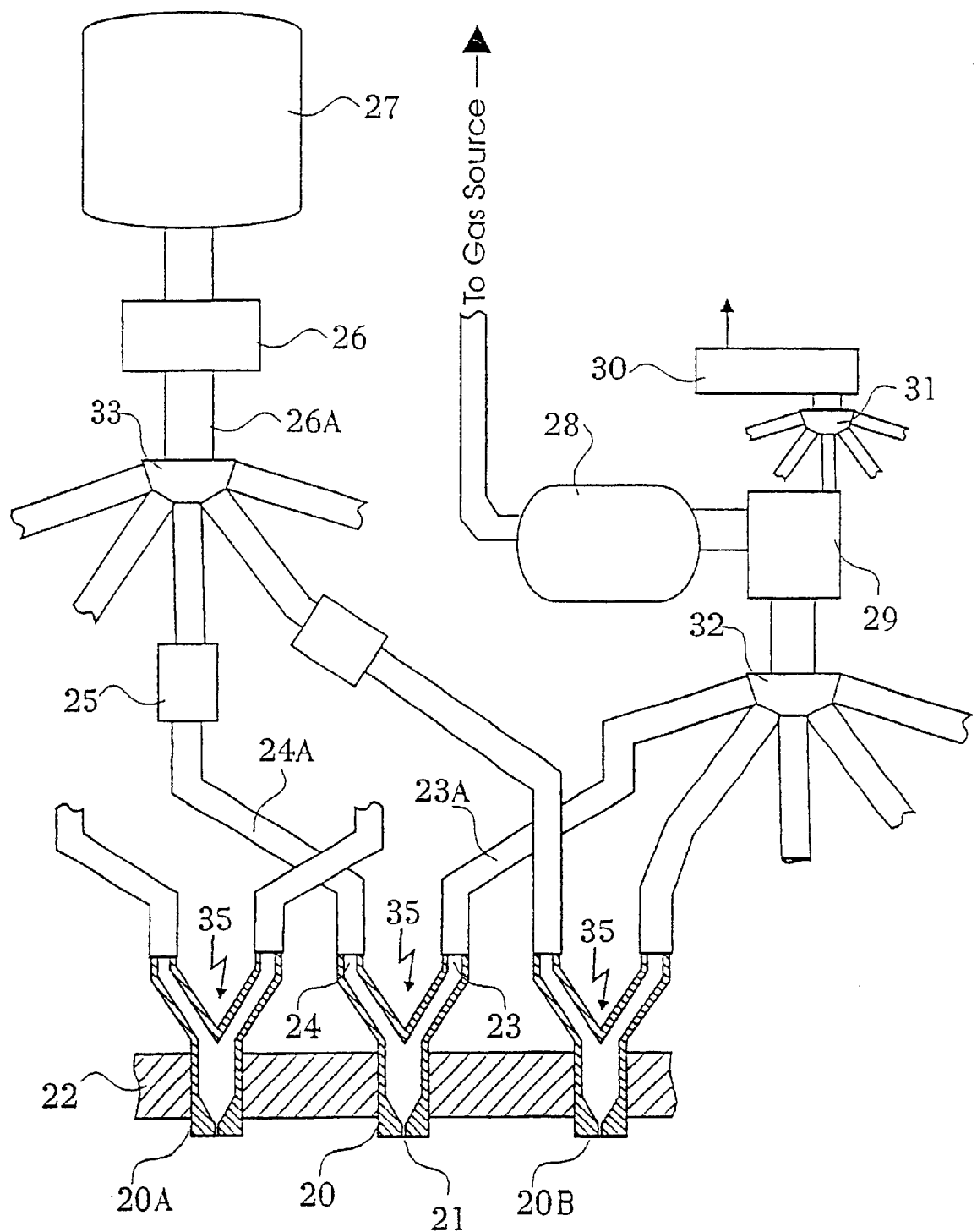

The present invention relates to a multi-barrel plant inoculation gun (hereinafter called also: MBG) for a rapid large-scale plant anti virus inoculation. The MBG performs the plant anti virus inoculation by simultaneously shooting a plurality of compressed gas jets carrying inoculum solution particles into the inner tissues of plants within the gun's coverage area. The present invention further relates to a combination of the MBG and a conveying mechanism, wherein the conveying mechanism is either for conveying green-house plant trays to the shooting coverage area of the MBG, or for conveying the MBG along rows of plants in a green-house or any other treatment area.

BACKGROUND OF THE INVENTION

A well known method in the field of plant anti virus inoculation is the Cross Protection method. According to this method, the inoculation of a crop against a virulent strain of virus is achieved by infecting the crop with a mild strain of the same virus.

The mechanism by which cross protection operates is not yet fully understood, and there are different proposed hypotheses trying to explain it. Whatever the mechanism is the present invention deals only with its practical implementation.

It is well known that for the success of the inoculation, it is not essentially required to infect individually every plant, and some certain percentage of it (according to the specific type of inoculum or crop) is enough. However, a minimal infection percentage is needed for the commercial effectiveness of inoculation.

After the infection procedure is accomplished, the mild virus develops inside the plants. At the end of the process (i.e. after the mild virus strain was settled, duplicated and dispersed to all the portions of the plant), the inoculated crops become tenable against the virulent strain of virus. In various types of crops or inoculation procedures (according to the same method), there is a need to repeat the infection procedure once again or even twice (in intervals of a week or two), for better results.

Until now, infecting the plants with the mild strain of virus, is achieved by hand-rubbing of each plant in the greenhouse with the appropriate inoculum, or by using an electric hand leaf blower for blowing the inoculum solution on each plant. Both hand-rubbing and blowing methods are extremely time intensive, and often fail to insure the achievement of the minimal infectious percentage needed for an effective plant inoculation.

WO 96/05721 discloses a method for delivering an effective amount of exogenous chemical substance to a non-woody living tissue of a plant, whereby said substance is applied simultaneously or sequentially with local physical injury inflicted on the tissue of sufficient severity to kill or significantly damage individual cells. The invention also discloses compositions which are particularly adapted for use by the method of the invention, apparatus for delivering exogenous chemical substances by the method of the invention and leaf prepared by the invention. The apparatus taught in WO 96/05721 does not enable the maintenance of constant pressure levels with increasing the number of barrels which is a serious disadvantage.

The aim of the MBG according to the present invention is to effectively inoculate large-scale crops (usually in a greenhouse) by the mild strain of virus, thus saving time and money, and improving the inoculation reliability.

SUMMARY OF THE INVENTION

The present invention relates to multi-barrel plant inoculation gun (MBG) for a rapid large-scale plant anti virus inoculation comprising;

(a) liquid container for inoculum solution;

(b) compressed-gas source;

(c) at least one compressed-gas fast-discharge-container having a gas inlet connected to the said compressed-gas source, and a gas outlet connected to a gas fast-discharge-valve;

(d) plurality of jet-injection units each comprised of a body having; a liquid inlet connected to the said liquid container; a gas inlet connected to the said gas fast-discharge-valve; and a jet-outlet (in the context of the present invention called also "barrel") internally connected to the said liquid and gas inlets;

(e) control unit for triggering-on the fast-discharge valve;

(f) chassis for positioning and supporting said elements and their inter-connections;

wherein triggering-on the fast-discharge valve, discharges from the fast-discharge-container a powerful pulse of gas distributed simultaneously to the plurality of jet-injection units through the respective pipes and brought to contact the inoculum solution received from the liquid-container through the respective pipes, for accelerating particles of inoculum-solution and shooting inoculum solution by jets of gas from the jet-outlets into the inner tissues of plants.

According to the preferred embodiment, the MBG is further comprising a conveyor for conveying green-house plant trays under its shooting coverage area.

According to the preferred embodiment the MBG has a computer means and a user-panel for controlling its operation according to operation modes predetermined by its manufacturer or by its user through the user-panel.

Preferably, the conveyor include sensor means supplying to the computer-means data concerning the presence or location of plant trays, and the computer means correlates the shooting of inoculum-carrying jets with the convey of plant trays.

Preferably, the liquid container is a pressure-container connected to the compressed-gas source and having a pressure regulator valve obtaining a constant predetermined pressure adapted to drive out the inoculum-solution from the container in the accurate essential flow useful for the current inoculation job. According to another embodiment, the liquid container works without pressure and supplies the inoculum-solution by means of gravity force or by means of a pump. Preferably, according to both said liquid-container arrangements, an electrical faucet buffers between the container and the jet-injection-units for an improved control on the inoculum-solution consumption.

Preferably, the liquid container include means for whirling the inoculum solution, such as a motored propeller, a gas pipe bubbling within the liquid, a vibration motor vibrating the container or other known whirling means.

Preferably, the pipe connection between the liquid container and the jet-injection units is equipped with a unidirectional valve preventing a reverse flow of liquid or gas which may result during the fast-discharge of a gas pulse.

Preferably, the jet-injection-units are positioned on a flat matrix plate having crosswise orifices arranged in lines and rows, such that each jet-outlet (barrel) of the jet-injection-units is fixed vertically within one orifice (preferably by using integral threading made in the plate material).

Preferably, the connection between the matrix plate and the chassis is through an adjustable telescopic mechanism (or other adjustable acceptable mechanism) allowing to change the height (and/or orientation) of the plate for an optimal adaptation to the type and arrangement of the inoculated plants.

According to another embodiment, the MBG is further comprising conveying means for being propelled along green-house plant rows.

In the context of the present invention the term "gas source" refers to any type of gas supplier known in the art, either if it is carried by the MBG chassis or it is an external unit connected to the MBG by means of a gas hose. It may be an air compressor, a gas reservoir, a gas cylinder. Preferably the gas is air, however other gas types may be used as well.

The MBG may comprise mechanical or electromechanical means for changing or adjusting the orientation, height or lateral position of the matrix-plate relatively to the chassis. Thus, the MBG can be adapted for use with various types of plants, (or plant trays) having different dimensions, shapes, planting arrangements, or inoculation requirements.

According to another variation, the MBG is further comprises sensor means adapted to recognize the presence of plants below the matrix-plate and transmitting this data to the controlling unit, for automatically activating the MBG shooting, or for halting the convey mechanism of the machine at the end of a plant row.

Preferably, the inoculum solution is a hetrogenic solution containing particles (such as carborundum particles) useful for insertion into the inner tissues of plants when accelerated by the compressed gas. Thus, preferably the MBG, further comprises means for whirling the inoculum solution (within the liquid container) for providing a homogenize dispersion of the particles within the solution. Such means are an electrical mixer, or a gas pipe ended near the bottom of the liquid container for mixing the liquid by means of gas flow.

DETAILED DESCRIPTION OF THE INVENTION

The present invention solves the problem of reducing the pressure in each barrel with increasing the number of barrels by combining the following elements: at least one-compressed-gas fast-discharge container (28) having a gas inlet connected to a compressed-gas source, and a gas outlet connected to a gas fast-discharge-valve (29); and a control unit for triggering-on fast discharge valve. The compressed-gas fast-discharge container accumulates the gas pressure between successive operations, and then in a short period of time the accumulated pressure is discharged at once from all barrels. Triggering on the fast discharge valve, discharges from the fast-discharge-container a powerful pulse of gas distributed simultaneously to the plurality of jet injections units through the respective pipes, in order to accelerate the particles of inoculum-solution and shoot inoculum solution by jets of gas into the inner tissues of plants.

The present invention will be further described in detail by FIGS. 1–3. These figures are solely intend to describe one preferred embodiment of the MBG according to the present invention, and in no manner intend to limit the scope of the invention.

BRIEF DESCRIPTION OF THE FIGURES

FIG. 1 illustrates an isometric view of a chassis and a plant-tray conveyor of an MBG according to the present invention.

FIG. 2 illustrates a schematic diagram of three jet-injection unit of the MBG, and their associate connections as a part of a plurality of similar jet-injection units.

FIG. 3 illustrates in detail a schematic diagram of the liquid-container of FIG. 1.

DETAILED DESCRIPTION OF THE INVENTION

FIG. 1 illustrates an isometric view of a chassis and a plant-tray conveyor of an MBG according to the present invention. In this embodiment the chassis is a wheeled table (1) comprised of a supporting frame (2) having wheels (3) allowing moving from place to place comfortably, and a plant conveyor having a conveying-belt (4), moving endlessly around a drive-cylinder (5) and a tense-cylinder (6). The drive-cylinder (5) is driven by an electrical-motor (7) and a transmission belt (8). The conveying belt (4) is tensed by the drive-cylinder (6), and its associate tense-mechanism (12). The frame height can be made changeable by including a telescopic mechanism (or other acceptable height-adjusting mechanism) to the upright supports of the frame. The MBG user may control the conveyor speed through a user-panel (9) which controls the speed of the motor (7). Plant trays placed on the conveying belt (4) right side, are conveyed to a coverage area of the MBG below the matrix-plate support (10). The relative height of the matrix-plate (not shown in this figure) is adjustable by a telescopic vertical support (11). The plant tray within the MBG coverage area is bombarded by the MBG and then conveyed to the left of the conveyor. Mechanical sensor (13) (may be any other known sensor such as Photo-electric sensor) recognizes the presence of a treated (inoculated) plant tray and stops the conveyor until being removed. The inoculation can be made either during a successive convey, or during stops in the convey, as selected by the user through the user-panel (9).

FIG. 2 illustrates a schematic diagram of three jet-injection units of the MBG, and their associate connections as a part of a plurality of similar jet-injection units. Each jet-injection unit (35) (illustrated in a vertical cross-section view) is comprised of a body (20) (20A)(20B) having; a liquid inlet (24), a gas inlet (23), and a jet-outlet (21) internally connected to the said liquid and gas inlets. The liquid inlet (24) is connected to the liquid container (27) through a pipe (24A), a unidirectional valve (25) and an electrical faucet (26). The electrical faucet controls the flow of inoculum solution to the illustrated jet injection units (35) and to a plurality of similar jet-injection units (not seen in this figure), through the main pipe (26A) and the pipe-junction (33) to which the plurality of said units are connected. The gas inlet (23) is connected to a gas fast-discharge-valve (29) together with the gas inlets of a plurality of similar units which all are connected through the same gas-pipe junction (32). The fast-discharge valve (29) is connected to a fast-discharge-container (28), supplying a pulse of compressed-air to all the injection-units connected to the junction (32), always when the fast discharge valve (29) is triggered-on. The fast-discharge-container (28) is fed with a gas from a gas source (not seen in this figure) trough the gas inlet (34). The fast discharge valve (29) is a pneumatic valve controlled pneumatically by a pneumatic-control valve (30). The pneumatic control valve (30) is triggered-on by an electric signal received from a computer means of the MBG. A plurality of fast discharge valves (29) are connected to the pneumatic control valve (30) through a pneumatic control junction (31), wherein the gas inlet of each fast-discharge valve (29) is connected to a particular fast-discharge-container, and the gas outlet of the same valve (29) is connected to a plurality of jet-injection units. Thus, the total number of jet-outlets (barrels) of the MBG is a multiplication of the number of jet-injection units connected to each single fast discharge valve (29) with the total number of the fast discharge valves. The exact number of jet-injection units connected commonly to a single fast discharge container (28) and associate valve (29) may be calculated by a designer as a function of the length and width of the gas pipes, the gas capacity of the containers (28), the characteristics of the valve (29) and the jet-injection units (20), and the required jet pressure at the jet-outlets.

The characteristics of the jet-injection unit are mainly resulting from the dimensions (aperture diameter and width) of the jet-outlet (21), trough which pass the inoculation outlet jet. The aperture diameter is designed small enough such that inoculum solution cannot pass it without the push of a gas pulse received from the fast-discharge-container through the fast discharge valve. The electrical faucet (26) is opened periodically in the intervals between gas pulses, for supplying to all the injection-units a restricted dose of inoculum solution which is then delayed adjacent to the jet outlet aperture, waiting for the next pulse of gas.

Each jet injection unit is fixed in one from a plurality, of transverse holes made in a matrix-plate (22) which a small part of it is seen in this figure in a cross sectional view. The complete matrix-plate is to be positioned within the matrix-plate support (10) seen in FIG. 1 with the jet outlets oriented downwardly. Preferably each get injection units is comprised of an upper part having the gas and the liquid inlets and a lower part having the jet outlet, both parts are screwed into the matrix plate transverse holes by means of matching screw-threads.

Figure 3:
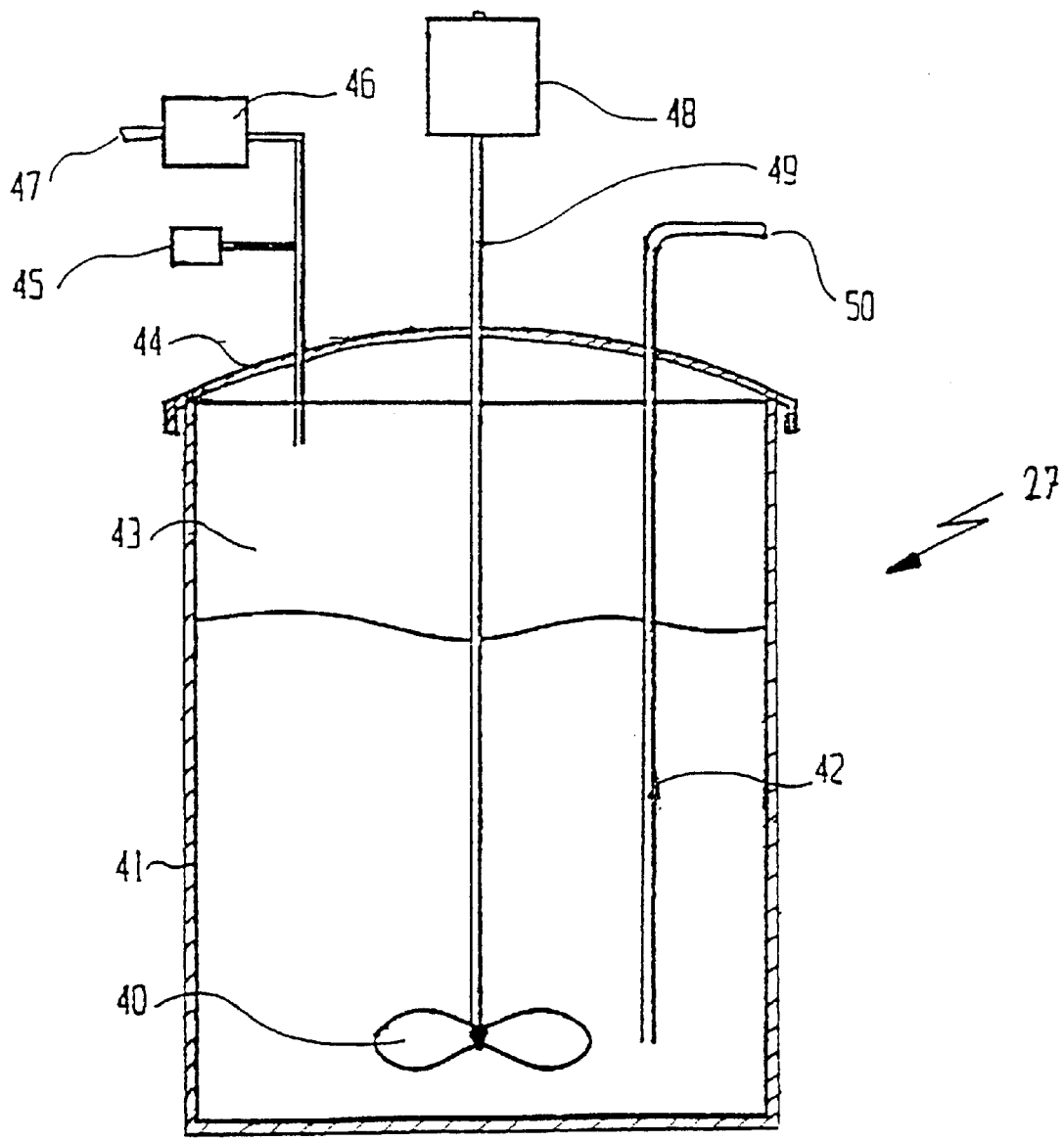

FIG. 3 illustrates in detail a schematic diagram of the liquid-container (27) of FIG. 1. This container is a pressure container comprised of a container body (41), a container cover (44), a mixer (40) driven by a piston motor (48) through the mixer shaft (49), a gas pressure inlet (47) having a pressure regulator valve (46), a security valve (45), and a liquid outlet (50) for supplying inoculum solution to the electrical faucet (26) of FIG. 1. The hetrogenic inoculum solution is whirled by the mixer for insuring its unity, and driven out through the outlet pipe (42) by means of the gas (43) pressuring the liquid in a constant pressure regulated by the regulator valve (46) and protected by the security valve (45). Thus, a controlled flow of inoculum solution is always provided to the jet-injection unit, without the influence of the remaining amount of liquid within the container.

What is claimed is:

1. A multi-barrel plant inoculation gun for a rapid large-scale plant anti virus inoculation comprising;
   (a) liquid container for inoculum solution (27);
   (b) compressed-gas source;
   (c) at least one compressed-gas fast-discharge-container (28) having a gas inlet connected to the said compressed-gas source, and a gas outlet connected to a gas fast-discharge-valve (29);
   (d) plurality of jet-injection units (35) each comprised of a body (20) having; a liquid inlet (24) connected to the said liquid container; a gas inlet (23) connected to the said gas fast-discharge-valve (29); and a jet-outlet (21) internally connected to the said liquid and gas inlets;
   (e) control unit for triggering-on the fast-discharge valve;
   (f) chassis for positioning and supporting said elements and their inter-connections;

wherein triggering-on the fast-discharge valve (29), discharges from the fast-discharge-container (28) a powerful pulse of gas distributed simultaneously to the plurality of jet-injection units (35) through the respective pipes and brought to contact the inoculum solution received from the liquid-container (27) through the respective pipes, for accelerating particles of inoculum-solution and shooting inoculum solution carried by jets of gas from the jet-outlets (21) into the inner tissues of plants.

2. A multi-barrel plant inoculation gun according to claim 1, further comprising a conveyor for conveying green-house plant trays under its shooting coverage area.

3. A multi-barrel plant inoculation gun according to claim 1 having a computer means and a user-panel for controlling its operation.

4. A multi-barrel plant inoculation gun according to claim 1 further comprising sensor means supplying to the computer-means data concerning the presence or location of plant trays, and the computer means correlates the shooting of inoculum-carrying jets with the convey of plant trays.

5. A multi-barrel plant inoculation gun according to claim 1, wherein the liquid container is a pressure-container connected to the compressed-gas source and having a pressure regulator valve obtaining a constant predetermined pressure adapted to drive out the inoculum-solution from the container in the accurate essential flow useful for the current inoculation job.

6. A multi-barrel plant inoculation gun according to claim 1 having an electrical faucet buffers between the container and the jet-injection-units for controlling the consumption of inoculum-solution.

7. A multi-barrel plant inoculation gun according to claim 1, wherein the liquid container include whirling means for whirling the inoculum solution.

8. A multi-barrel plant inoculation gun according to claim 1 wherein the pipe connection between the liquid container and the jet-injection units is equipped with a unidirectional valve preventing a reverse flow of liquid or gas which may result during the fast-discharge of a gas pulse.

9. A multi-barrel plant inoculation gun according to claim 1 wherein the jet-injection-units are positioned on a flat matrix plate having crosswise orifices arranged in lines and rows, such that each jet-outlet of the jet-injection-units is fixed vertically within on orifice.

10. A multi-barrel plant inoculation gun according to claim 1 wherein the connection between the matrix plate and the chassis is through an adjustable mechanism allowing to change the height of the plate for an optimal adaptation to the type and arrangement of the inoculated plants.

11. A multi-barrel plant inoculation gun according to claim 1 further comprising conveying means for being propelled along green-house plant rows.

12. A multi-barrel plant inoculation gun according to claim 1 further comprising sensor means adapted to recognize the presence of plants below the matrix-plate and transmitting this data to the computer means.

* * * * *